United States Patent [19]
Mason et al.

[11] Patent Number: 5,268,855
[45] Date of Patent: Dec. 7, 1993

[54] COMMON FORMAT FOR ENCODING BOTH SINGLE AND DOUBLE PRECISION FLOATING POINT NUMBERS

[75] Inventors: Russell W. Mason; Craig A. Heikes, both of Ft. Collins, Colo.

[73] Assignee: Hewlett-Packard Company, Palo Alto, Calif.

[21] Appl. No.: 944,566

[22] Filed: Sep. 14, 1992

[51] Int. Cl.$^5$ .............................................. G06F 7/38
[52] U.S. Cl. .............................. 364/748; 364/715.03
[58] Field of Search ........................... 364/748, 715.03

[56] References Cited

U.S. PATENT DOCUMENTS

| | | | |
|---|---|---|---|
| 3,872,442 | 3/1975 | Boles et al. | 364/715.03 X |
| 4,831,575 | 5/1989 | Kuroda | 364/748 |
| 5,038,309 | 8/1991 | Priem et al. | 364/715.03 |
| 5,161,117 | 11/1992 | Waggener, Jr. | 364/715.03 |

OTHER PUBLICATIONS

DeLano et al., "A High Speed Superscalar PA-RISC Processor", Proceedings of the Compcon Spring 1992, Digest of Papers, San Francisco, CA. Feb. 24-28, 1992.

Primary Examiner—Tan V. Mai

[57] ABSTRACT

A technique for encoding multiple floating point formats into a double precision floating point number by padding single word floating point numbers with zeros to form a 64-bit double word in a way that allows a single precision arithmetic logic unit to be built on top of a double precision arithmetic logic unit. The formatting circuitry of the invention requires only small differences in the hardware for single and double precision operations so as to simplify the arithmetic logic unit and the multiplier of the floating point processing units. The encoding technique of the invention includes right justifying the exponent and mantissa of the floating point number in a "common format" such that rounding of the mantissa need only occur in one place, thereby greatly simplifying the rounding procedure. The technique of the invention also removes multiplexers from critical speed paths in the floating point processing units when it is desired to accommodate multiple data formats.

4 Claims, 6 Drawing Sheets

COMMON FORMAT FOR ENCODING BOTH SINGLE AND DOUBLE PRECISION FLOATING POINT NUMBERS

BACKGROUND OF THE INVENTION

1. Field of the Invention

The present invention relates to a technique for processing single and double precision floating point numbers and, more particularly, to a technique for encoding multiple floating point formats into a "common" double precision floating point format in a way that allows a single precision arithmetic logic unit to be built on top of a double precision arithmetic logic unit while minimizing the hardware requirements for supporting multiple formats.

2. Description of the Prior Art

Recently, floating point processors have been designed which allow concurrent execution of a floating point multiply, divide, add and load or store instructions, thereby significantly increasing the processing efficiency of a floating point processor. For example, DeLano et al. describe in an article entitled "A High Speed Superscalar PA-RISC Processor", *Proceedings of the Compcon Spring 1992, Digest of Papers*, San Francisco, CA, Feb. 24–28, 1992, a central processing unit comprising an integer processor and a floating point coprocessor which achieves exceptional performance and structural density. The floating point coprocessor consists of a register file, a floating point ALU, a floating point multiplier, and a floating point divide/square root unit and is integrated onto the same chip as the integer processor. Dynamic logic was used to exploit the speed and density characteristics of such circuits using a system of self-timed logic.

Floating point coprocessors of the type described by DeLano et al. typically comprise either single precision (i.e., operating on 32-bit operands) or double precision (i.e., operating on 64-bit operands) processing units. As is well known to those skilled in the art, single and double precision binary floating point numbers are typically formatted to have three fields: a sign bit, s; several exponent bits, e; and several fraction or mantissa bits, f. In accordance with the standard IEEE twos complement floating point format, the bits of the floating point numbers are arranged such that the most significant bit is the sign bit s, the next most significant bits are the exponent bits e, and the least significant bits represent the mantissa f. Numbers in such floating point formats may either be normalized numbers, denormalized numbers, infinity, zero, or some other non-numerical value. However, each representable non-zero numerical value typically has just one encoding.

Prior art floating point processors contain 32 or 64-bit data registers which the floating point instructions use as operands. Software of the floating point processors accesses these data registers with single or double word load and store instructions. Each of the floating point data registers may contain values in a number of different formats.

Conventionally, floating point processing units perform double precision operations using single precision (i.e., 32-bit) data paths, whereby two iterations through the floating point units are required to compute a result in a double precision format. For example, for double precision addition the two double precision operands A and B are respectively stored in two consecutive single precision storage locations. If the exponent of operand A is greater than the exponent of operand B ($e_a > e_b$), then operand A is loaded into concatenated registers $A_{HIGH}$ (most significant word) and $A_{LOW}$ (least significant word). The fraction is shifted right with corresponding increments to $e_a$ until $e_a = e_b$. The least significant word of operand B is loaded into another register, register B, and the sum $A_{LOW} + B$ is formed and stored in register $A_{LOW}$. The carry bit is saved. Then, the remaining mantissa bits of operand B are loaded into register B. The sum of $A_{HIGH} + B + Carry$ is formed and stored in register $A_{HIGH}$. The sum is the concatenation of $A_{HIGH}$ and $A_{LOW}$, and the sum can be normalized by shifting left and rounding or truncating.

Previously, integrated circuit process technology has not provided the device density necessary to implement a 64-bit arithmetic data path on the same chip as the integer processor. However, recent advances in integrated circuit technology now make this possible. Because of this breakthrough, it is now possible to integrate a double precision floating point unit onto the same chip as the integer processor so as to achieve a high level of double precision performance. However, at the same time, it is desired to also support high single precision performance with minimal hardware requirements to support arithmetic in multiple data formats. The present invention has been designed to meet this need.

SUMMARY OF THE INVENTION

The above-mentioned need in the art has been met by providing a technique for formatting both single and double precision floating point numbers into a common format in which the least significant bits of the exponent and mantissa of both single and double precision formats are aligned with each other. As a result, when the mantissa is rounded in accordance with the invention, the rounding logic need only start rounding at the least significant bits of the mantissa. The same rounding logic can be used regardless of the precision of the operation. This is possible in accordance with the invention since the least significant bits of the mantissa are aligned for purposes of rounding both when the mantissa is a part of a single precision floating point number and when the mantissa is part of a double precision floating point number. Also, by so aligning the least significant bits of the exponent and the mantissa, the present technique simplifies the arithmetic logic unit and floating point multiplier circuitry while further providing consistent encoding across the respective floating point processing units for both single and double precision input operands.

In order to achieve higher double precision performance, the present invention includes a 64-bit data path capable of performing operations on double precision operands in a single iteration. However, in accordance with the invention, single precision operations are supported by the same double precision data path. In other words, 64-bit operand buses are provided by the present inventors for use with the floating point processing unit so that double precision operations can be started every state. Then, by efficiently mapping the 32-bit single precision and short integer operands into this 64-bit double word, the efficiency of the floating point unit can be increased.

A preferred embodiment of the invention relates to a processor for performing floating point operations on operands which are input in multiple floating point formats. Such a processor in accordance with the invention preferably comprises a data register for storing single or double precision operands and a floating point operation unit for performing floating point mathematical operations on the operands stored in the data register. In accordance with the invention, the processor is characterized by means for converting the operands from the data register into operands in a common format having the precision of the floating point operation unit and for providing the operands in the common format to the floating point operation unit for processing. In accordance with the invention, the operand converting means is further characterized by means for aligning the least significant bits of the exponents and mantissas of both single and double precision representations of the operands. A predetermined number of bits of predetermined logic value is inserted into the most significant bits of the exponents and mantissas of the operands so as not to affect the alignment of the least significant bits of the exponents and mantissas of the operands when in the common format. In addition, a predetermined number of most significant bits of the exponents and mantissas of the results are eliminated when converting a result from the common format to the IEEE format. Generally, there is no mixing of precision for the corresponding operation.

In a preferred embodiment, the operand converting means comprises a multiplexer responsive to control lines indicating whether the current floating point instruction operates on single word integers, single precision floating point, double word integers, or double precision floating point operands and at least one result in the common format output from the floating point operation unit at respective inputs thereof. Preferably, the data type is encoded in the floating point instruction so that it is not necessary for the multiplexer to check the data type of the input operands. In response to these inputs, the multiplexer then provides a single output to the floating point operation unit for further processing.

The scope of the invention also includes a method of performing floating point operations on floating point operation means, comprising the steps of providing input data as single or double precision input operands, converting the input operands into operands in a common format of the floating point operation means, and providing the input operands in the common format to the floating point operation means for processing. Preferably, the operand converting step comprises the steps of aligning the least significant bits of the exponents and mantissas of single and double precision representations of input operands in the common format, eliminating a predetermined number of most significant bits of the exponents and mantissas of the input operands when converting an input operand from common format to a single precision format, and inserting the predetermined number of bits of a predetermined logic value into the most significant bits of the exponents and mantissas of the input operands when converting an input operand from the single precision to the common format. When such a method is used, only small differences between single and double precision operations are detectable.

BRIEF DESCRIPTION OF THE DRAWINGS

The objects and advantages of the invention will become more apparent and more readily appreciated from the following detailed description of the presently preferred exemplary embodiment of the invention taken in conjunction with accompanying drawings, of which.

DETAILED DESCRIPTION OF THE PRESENTLY PREFERRED EXEMPLARY EMBODIMENT

The inventors of the subject matter disclosed and claimed herein have satisfied the above-mentioned need in the art by developing an operand alignment circuit which permits a single precision arithmetic logic unit to be built on top of a double precision arithmetic logic unit with minimal hardware requirements required to support both single and double precision operations. Such an operand alignment circuit in accordance with a presently preferred exemplary embodiment of the invention will be described below with respect to FIGS. 1-6. However, it will be appreciated by those of ordinary skill in the art that the description given herein with respect to those figures is for exemplary purposes only and is not intended in any way to limit the scope of the invention. Accordingly, all questions regarding the scope of the invention should be resolved by referring to the appended claims.

Figure 1:
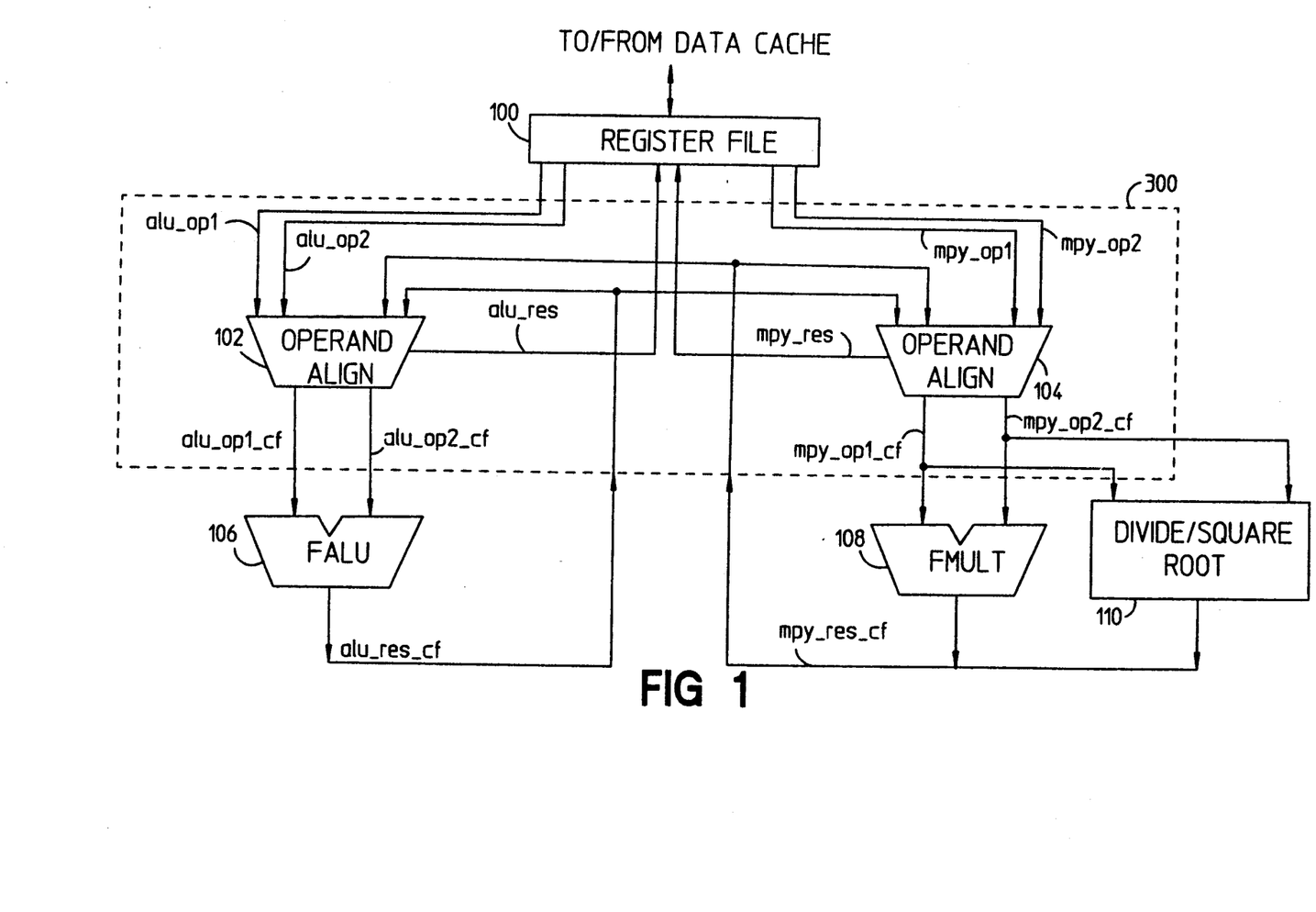
FIG. 1 illustrates a simplified block diagram of a floating point processor in accordance with the invention.

FIG. 1 illustrates a preferred embodiment of a floating point data path of a floating point processor in accordance with the invention. As illustrated, the floating point data path includes a register file 100 comprising a plurality of registers for storing input data such as operands from the processor's data cache. In a preferred embodiment, register file 100 has 28 64-bit registers, each of which can be used as two 32-bit registers for single precision operations. The floating point data path further comprises operand alignment circuits 102 and 104 which convert operands (alu_op1, alu_op2, mpy_op1, mpy_op2) from the register file 100 into a common format acceptable by floating point ALU (FALU) 106, floating point multiplier (FMULT) 108 and floating point divide/square root circuit 110. In the illustrated embodiment, it is assumed that FALU 106, FMULT 108 and floating point divide/square root circuit 110 are double precision. Accordingly, the outputs of operand alignment circuits 102 and 104 are 64-bit common format double precision (as indicated by appending "_cf" to the end of the operand outputs).

As illustrated in FIG. 1, operands provided to FALU 106 from the data cache via register file 100 and operand alignment circuit 102 may be added to the output operands alu_res_cf of FALU 106 or mpy_res_cf of FMULT 108 and divide/square root circuit 110 by passing the respective output operands straight through operand alignment circuit 102 (the output operands are already in the common format) for addition in FALU 106. Similarly, operands provided to FMULT 108 from the data cache via register file 100 and operand alignment circuit 104 may be multiplied or divided by the output operands alu_res_cf of FALU 106 or mpy_res_cf of FMULT 108 and divide/square root circuit 110 by passing the respective output operands straight through operand alignment circuit 104 (again the output operands are already in the common format) for multiplication in FMULT 108 or division in divide/square root circuit 110. The results alu_res and mpy_res of these operations may be stored back in register file 100 in the appropriate format as desired.

Figure 2A:
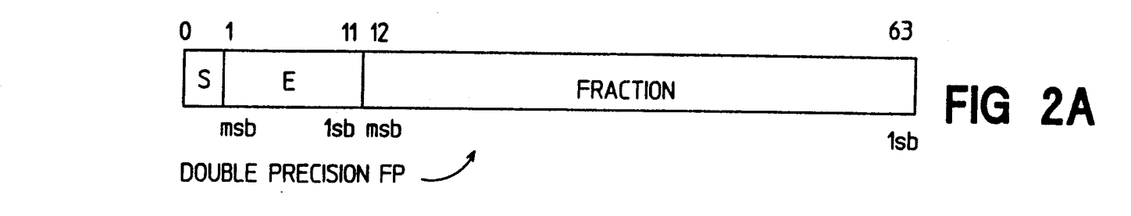
FIGS. 2(a)-(b) respectively illustrate formats for a double precision floating point number, a single precision floating point number, a short integer, and a long integer in accordance with the invention.
Figure 2B:
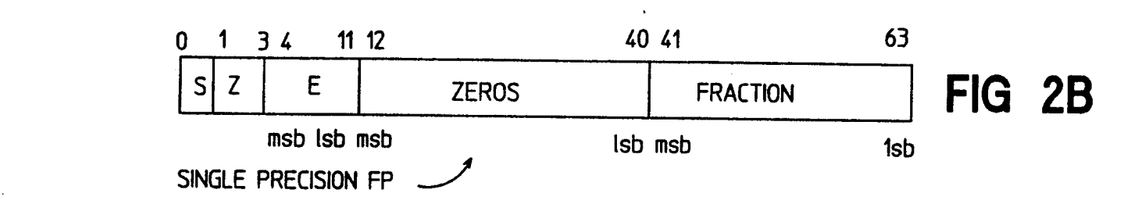

In accordance with the invention, operands from the register file 100 may have one of multiple formats including single or double precision floating point or short or long integers. As illustrated in FIG. 2(a), a common format double precision floating point number in accordance with the invention has the sign bit, s, as its most significant bit, followed by an 11-bit exponent, e, and then a 52-bit fraction. On the other hand, single precision common format floating point numbers are preferably formatted as illustrated in FIG. 2(b). As illustrated, the fraction is placed in the 23 least significant bits so as to be aligned with the least significant bits of the fraction in the double precision common format floating point number of FIG. 2(a). Similarly, the exponent is placed in bits 4-11 so that its least significant bits are aligned with the least significant bits of the exponent of the double precision common format floating point number of FIG. 2(a). The remainder of the bits (i.e., bits 1-3 and 12-40) are padded with zeros, although these bits could obviously be padded with some other value as desired. By so aligning the least significant bits of both the exponent and the fraction of the single and double precision common format floating point numbers, the fraction field may be rounded using rounding logic disposed only in one place (at the least significant bit). Hence, additional rounding logic is not required in the middle of the data path as when the single precision number is merely padded with 32 consecutive zeros. This substantially simplifies the rounding process. Finally, the short and long integers illustrated in FIGS. 2(c) and 2(d) may be formatted in the common format in a straightforward manner as illustrated.

Encoding multiple number formats into a 64-bit double word in a "common format" as just described provides several advantages that result in the minimization of the hardware required for supporting both double and single precision arithmetic, as well as conversions from one format to another. For example, by aligning the least significant bits of the mantissas for each format, as shown in FIG. 2, the rounding logic is simplified in that the same rounding logic can be used regardless of the precision of the operation. In other words, the basic addition is the same for both single and double precision operands in the common format. This differs from arrangements in which the most significant bits of the mantissa are aligned and the least significant bit location for single and double precision is in different places. For example, in implementations in which the most significant bits of the mantissa are aligned, the least significant bit of the mantissa for double precision is bit 63, while in single precision arithmetic, the least significant bit of the mantissa is bit 34. Since the hardware requirement for selecting the proper bit location for the most significant bits and overflow bits is significantly less than that required for implementing the rounding logic, it is advantageous to align the least significant bit of the mantissa.

Moreover, by aligning the least significant bit of the exponents in the common formats as shown in FIG. 2, the hardware required to implement the exponent logic is simplified. For addition, the critical path is the alignment of the mantissas prior to addition by shifting the number with the smaller exponent to the right by an amount equal to the difference in the two exponents. The comparison of the two exponents is performed by checking the carry out of the exponent subtractor. As with the mantissa, the location of the most significant bit of the exponent thus depends on the precision of the operands (bit 1 for double precision and bit 4 for single precision and common formats). By pinning the location of the least significant bit, the same subtractor can be used for this function for both single and double precision operands in the common format. Moreover, the logic required to select the proper location for the most significant bit of the exponent in the common format is significantly less than that required to determine the shift amount if the least significant bits were not pinned.

Figure 2C:
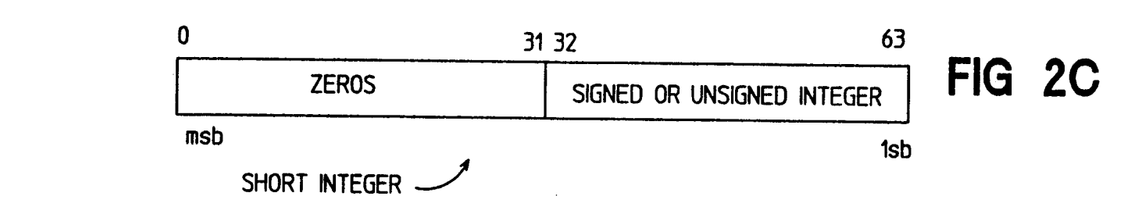
Figure 2D:
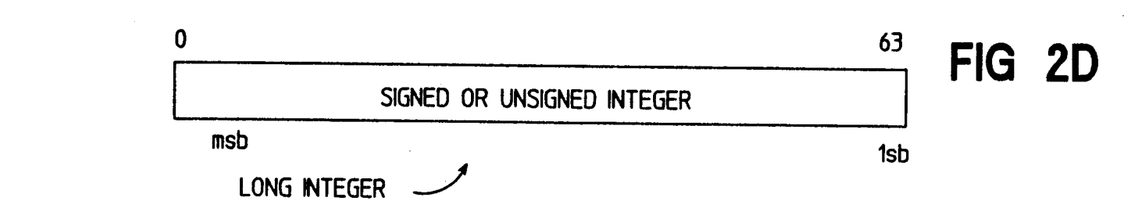
Figure 3:
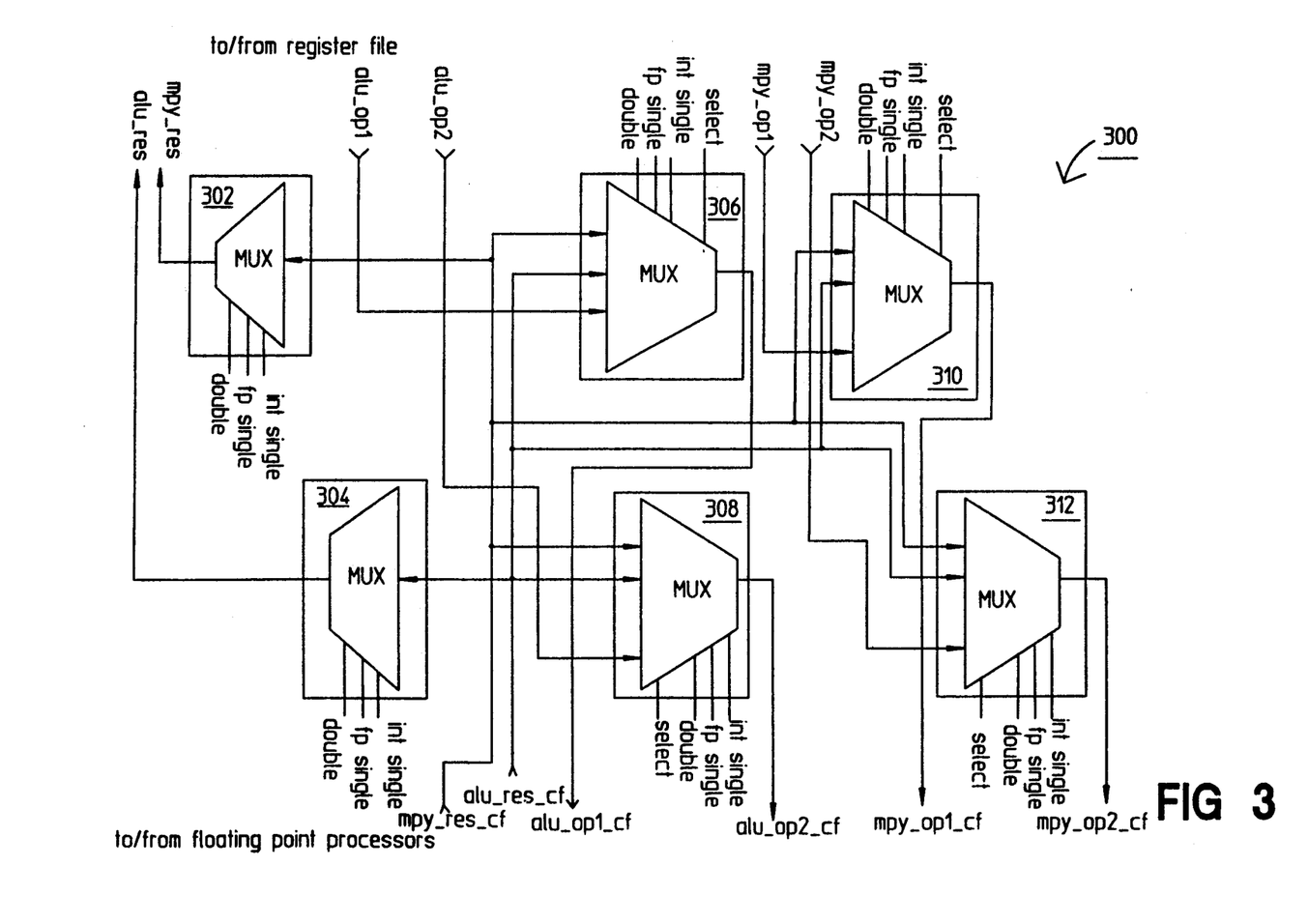
FIG. 3 illustrates a preferred embodiment of operand alignment circuitry 300 of the floating point processor in the embodiment of FIG. 1.

As illustrated in FIG. 3, the operand alignment circuits 102 and 104 are actually part of an operand alignment circuit 300 which comprises a plurality of multiplexers 302-312 which are responsive to short or long integers or single or double precision floating point numbers for converting those numbers into common format double precision numbers for processing by double precision floating point processors in the manner just described. As shown, either alu_res_cf, mpy_res_cf or an input operand (alu_op1, alu_op2, mpy_op1, mpy_op2) in an IEEE standard floating point or integer format is passed from the register file 100 to the floating point processing units 106-110 after being converted into the common format in accordance with the invention (FIG. 2). Of course, those skilled in the art will appreciate that the floating point processing units 106-110 may be single precision floating point processing units and that the operand alignment circuit 300 would accordingly convert input operands into "common format" single precession floating point values for use by the floating point processing units 106-110. As also illustrated in FIG. 3, bypass units 302 and 304 may directly pass the results mpy_res and alu_res directly from the floating point processing units 106-110 to the register file 100 for storage. The floating point units 106-110 then generate results in the "common format" which can be bypassed from one operation to another in the "common format" with first being converted back into IEEE floating point or integer format. The results are then converted from "common format" to IEEE floating point or integer format for storage in the register file 100.

The floating point processor of the invention thus comprises an operand alignment circuit 300 which functions as a large multiplexer/shifter which formats data being transferred between the register file 100 and the floating point processing units 106-110. The operand alignment circuit 300 in accordance with the invention formats the operands going from the register file 100 to the "common format" for processing by the floating point processing units (alu_op1_cf, alu_op2_cf, mpy_op1_cf, mpy_op2_cf) and the "common format" results (alu_res_cf, mpy_res_cf) from the floating point processing units 106-110 to the IEEE floating point or integer format for storage in the register file 100. Preferably, separate multiplexers are provided for each operand bus to the floating point processing units 106–110 and for each result bus out of the floating point processing units 106–110 so that there are six multiplexers as illustrated in FIG. 3.

The data formatting in accordance with the invention will now be described below with respect to Table 1 and FIGS. 4 and 5, where it will be assumed that bit zero is the most significant bit and bit 63 is the least significant bit of an input double word operand.

Operand alignment circuit 300 performs at least four separate data transfers from the register file 100 to the floating point processing units 106–110 in accordance with the invention:

(1) A single precision floating point data transfer from register file 100 to the floating point processing units 106–110 occurs by padding the 32-bit single precision floating point number with zeros into a 64-bit double word with the following format (FIG. 2(b)):

| Common Format | IEEE Single Precision Floating Point |
|---|---|
| double[41:63] | := single[41:63]; (fraction) |
| double[12:40] | := 0; |
| double[4:11] | := single[33:40]; (exponent) |
| double[1:3] | := 0; |
| double[0] | := single[32]; (sign). |

(2) A double word floating point data transfer from register file 100 to the floating point processing units 106–110 occurs as a straightforward transfer between the register file 100 and the floating point processing units 106–110 in that there is no shifting or data padding required (FIG. 2(a)).

(3) A short integer data transfer from register file 100 to the floating point processing units 106–100 occurs by placing the least significant word of the 64-bit double word into the floating point processing units 106–110 as illustrated in FIG. 2(c). The most significant single word is then padded with zeros. In other words:

| Common Format | Single Integer |
|---|---|
| double[32:63] | := single[32:63] |
| double[0:31] | := 0. |

(4) A long integer from the register file 100 may be directly transferred to the floating point processing units 106–110 since there is no shifting or data padding required.

On the other hand, for data transfers from the floating point processing units 106–110 to the register file 100, there are again four different possibilities in accordance with the invention:

(1) A single word floating point data transfer from the floating point processing units 106–110 to the register file 100 is the inverse of the single word transfer from the register file 100 to the floating point processing units 106–110. The single word is contained in a 64-bit double word and must be packed into a 32-bit single word by removing the padding zeros:

| IEEE Single Precision FP | Common Format |
|---|---|
| single[41:63] | := double[41:63] (fraction) |
| single[33:40] | := double[4:11] (exponent) |
| single[32] | := double[0] (sign). |

(2) A double word floating point data transfer from the floating point processing units 106–110 to the register file 100 is a straightforward transfer since no shifting or data padding is required.

(3) Data transfer of a short integer from the floating point processing units 106–110 to the register file 100 is performed by containing the 32-bit short integer inside the 64-bit double word from the floating point processing units 106–110 and packing the 32-bit single word by removing the padding zeros:

| Single Integer | Common Format |
|---|---|
| single[32:63] | := double[32:63]. |

(4) The data transfer of a long integer from the floating point processing units 106–110 to the register file 100 is again a straightforward transfer since no shifting or data padding is required.

Those skilled in the art will appreciate that there are cases where data from the floating point processing units 106–110 may bypass the register file 100 and be fed back directly as input into the floating point processing units 106–110. In such instances, no shifting is required because the data is already in the common format. In other words, the operand alignment circuit 300 in accordance with the invention may bypass each of the outputs alu_res_cf and mpy_res_cf to each of the operand alignment ports of operand alignment circuits 102 and 104 as illustrated in FIG. 1. By not having to return to the IEEE floating point domain for further processing of the results, performance advantages may be obtained. Without the common format, each floating point processor 106–110 would be required to accept the operands in IEEE floating point or integer format, perform its own alignment prior to starting the operations, and convert the result back into IEEE floating point or integer format. Much processing time is saved by not having to change processing domains before passing the result to a second floating point processor for further processing.

The following Table 1 illustrates the operand formatting for converting double precision operands into single precision floating point or single precision integer values in accordance with the invention:

TABLE 1

| | | Operand Formatting | | |
|---|---|---|---|---|
| Output | Double | FP Single | Int Single | |
| 0 | 0 | 32 | zero | GROUP 1 |
| 1 | 1 | zero | zero | GROUP 2 |
| 2 | 2 | zero | zero | |
| 3 | 3 | zero | zero | |
| 4 | 4 | 33 | zero | GROUP 3 |
| 5 | 5 | 34 | zero | |
| 6 | 6 | 35 | zero | |
| 7 | 7 | 36 | zero | |
| 8 | 8 | 37 | zero | |
| 9 | 9 | 38 | zero | |
| 10 | 10 | 39 | zero | |
| 11 | 11 | 40 | zero | |
| 12 | 12 | zero | zero | GROUP 4 |
| 13 | 13 | zero | zero | |
| 14 | 14 | zero | zero | |

TABLE 1-continued

| | Operand Formatting | | | |
|---|---|---|---|---|
| Output | Double | FP Single | Int Single | |
| 15 | 15 | zero | zero | |
| 16 | 16 | zero | zero | |
| 17 | 17 | zero | zero | |
| 18 | 18 | zero | zero | |
| 19 | 19 | zero | zero | |
| 20 | 20 | zero | zero | |
| 21 | 21 | zero | zero | |
| 22 | 22 | zero | zero | |
| 23 | 23 | zero | zero | |
| 24 | 24 | zero | zero | |
| 25 | 25 | zero | zero | |
| 26 | 26 | zero | zero | |
| 27 | 27 | zero | zero | |
| 28 | 28 | zero | zero | |
| 29 | 29 | zero | zero | |
| 30 | 30 | zero | zero | |
| 31 | 31 | zero | zero | |
| 32 | 32 | zero | 32 | GROUP 5 |
| 33 | 33 | zero | 33 | |
| 34 | 34 | zero | 34 | |
| 35 | 35 | zero | 35 | |
| 36 | 36 | zero | 36 | |
| 37 | 37 | zero | 37 | |
| 38 | 38 | zero | 38 | |
| 39 | 39 | zero | 39 | |
| 40 | 40 | zero | 40 | |
| 41 | 41 | 41 | 41 | GROUP 6 |
| 42 | 42 | 42 | 42 | |
| 43 | 43 | 43 | 43 | |
| 44 | 44 | 44 | 44 | |
| 45 | 45 | 45 | 45 | |
| 46 | 46 | 46 | 46 | |
| 47 | 47 | 47 | 47 | |
| 48 | 48 | 48 | 48 | |
| 49 | 49 | 49 | 49 | |
| 50 | 50 | 50 | 50 | |
| 51 | 51 | 51 | 51 | |
| 52 | 52 | 52 | 52 | |
| 53 | 53 | 53 | 53 | |
| 54 | 54 | 54 | 54 | |
| 55 | 55 | 55 | 55 | |
| 56 | 56 | 56 | 56 | |
| 57 | 57 | 57 | 57 | |
| 58 | 58 | 58 | 58 | |
| 59 | 59 | 59 | 59 | |
| 60 | 60 | 60 | 60 | |
| 61 | 61 | 61 | 61 | |
| 62 | 62 | 62 | 62 | |
| 63 | 63 | 63 | 63 | |

Figure 4:
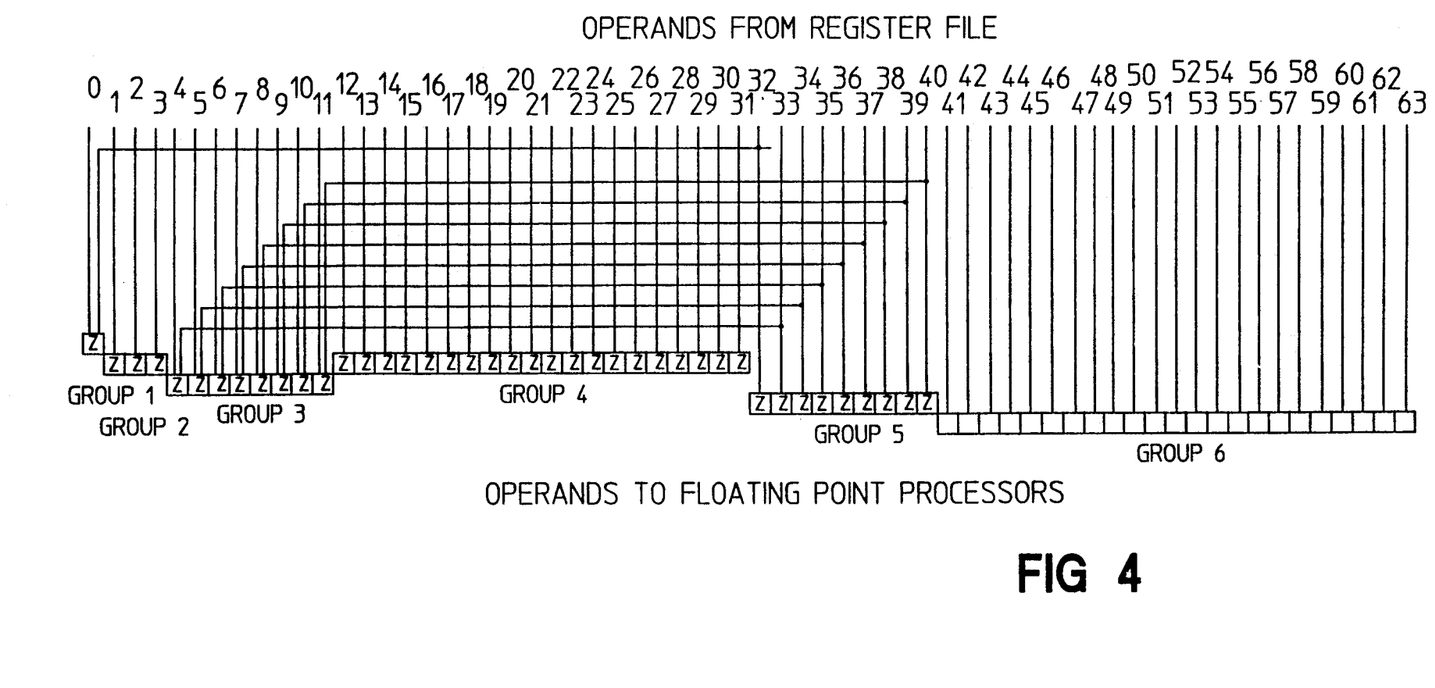
FIG. 4 illustrates the connections for converting a double word operand from the register file to single or double word operands for the floating point processing units in accordance with the invention.

FIG. 4 illustrates the connections for implementing the common format of Table 1. As illustrated, the double words from the register file 100 are separated into six separate groups with common connections to the floating point processors. In FIG. 4, the values "Z" indicate that it is possible for the output to be merely connected to a logical zero.

Figure 5:
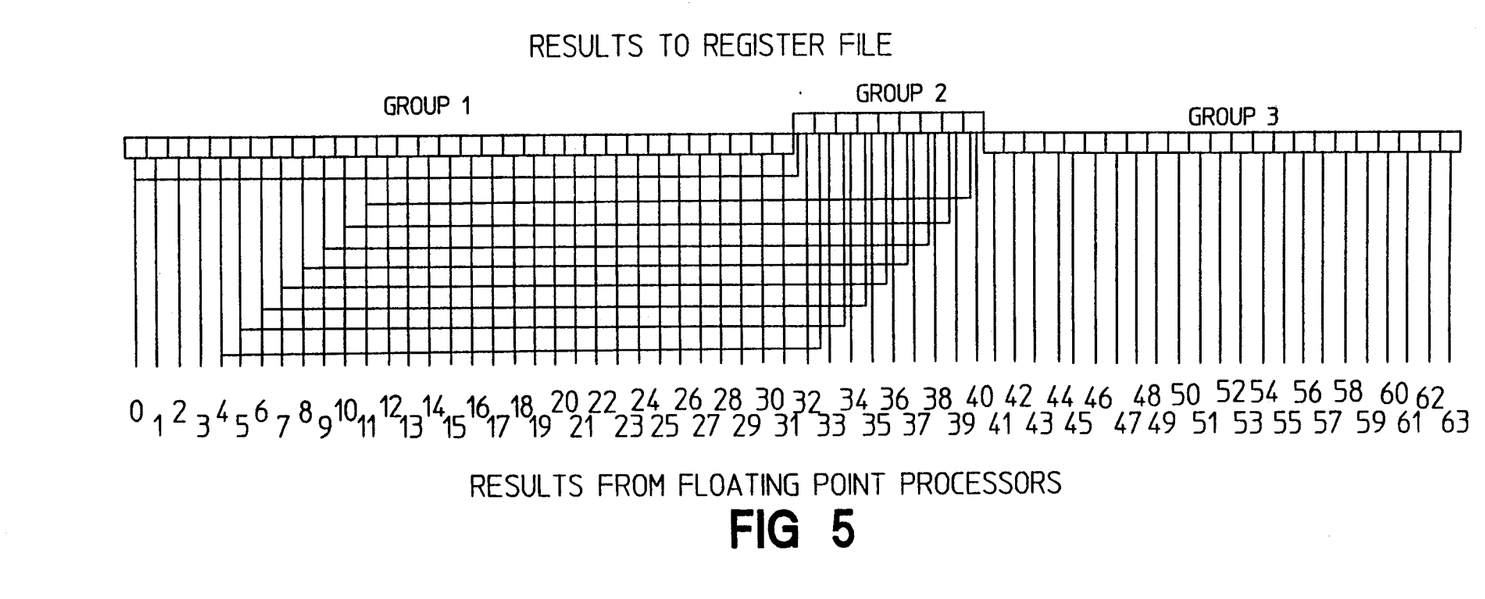
FIG. 5 illustrates the connections for converting the double word results from the floating point processing units to single or double word results for the register file.

FIG. 5 similarly illustrates the connections for converting the results from the floating point processing units 106–110 into the single or double precision formats acceptable by the register file 100. For this purpose, the bits of the results from the floating point processing units 106–110 (in "common format") are converted into three groups which are commonly connected as illustrated. As shown, groups 2 and 3 may be used to form the single precision numbers, while groups 1–3 are used for the double precision numbers.

The formatting of the operands by operand alignment circuit 300 in accordance with the invention is accomplished using a 5:1 multiplexer whereby three of the multiplexer inputs are the three register file formats—double word, single precision floating point and single word integers (FIG. 3). The other two inputs are the results alu_res_cf and mpy_res_cf from FALU 106 and FMULT 108 or divide/square root unit 110, respectively, which are bypassed as operands to the floating point processing units 106–110 without any change in format.

Figure 6:
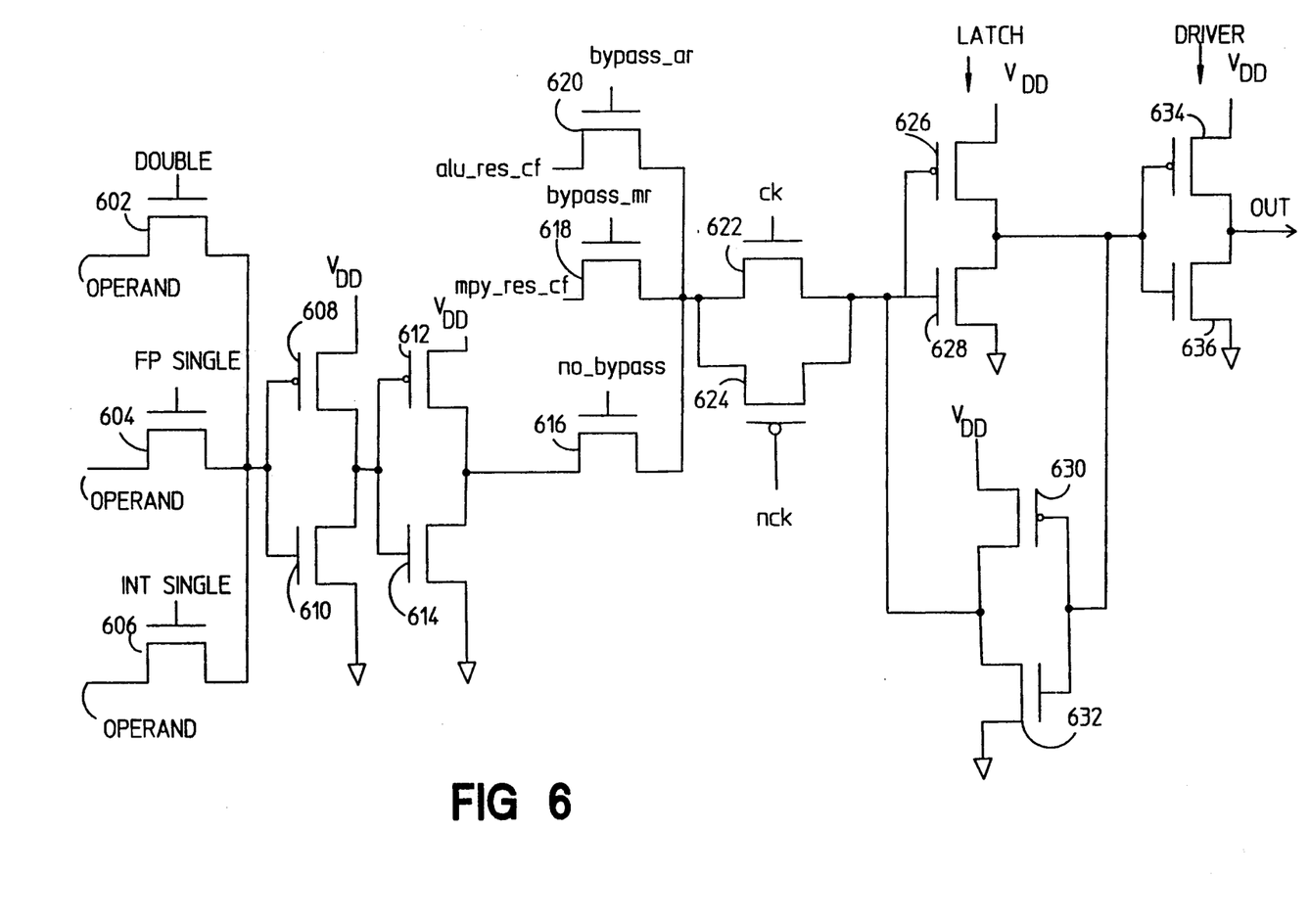
FIG. 6 illustrates a 5:1 multiplexer for formatting the operands in accordance with the techniques of the invention.

A preferred embodiment of such a 5:1 multiplexer is illustrated in FIG. 6. As shown, this multiplexer is implemented in two stages. In the first stage, the input operands pass through respective transfer gates 602, 604 and 606, which are responsive to the three register file formats double word, single precision floating point and single word integer as illustrated. The selected operand is passed to a first inversion circuit comprising PFET 608 and NFET 610 and a second inversion circuit comprising PFET 612 and NFET 614. The respective inversion circuits function to restore the input signal so as to maintain processing speed. Hence, the first stage comprises a 3:1 multiplexer which puts the data in the proper format.

The second stage of the 5:1 multiplexer is used to multiplex between the operand from the register file 100 provided via transfer gate 616 and the bypassed results (i.e., mpy_res_cf and alu_res_cf) provided via transfer gates 618 and 620, respectively. The 5:1 multiplexed signal is then passed through a gating circuit comprising NFET 622 and PFET 624 before being input into a latch comprising PFET 626, NFET 628, PFET 630, and NFET 632. The latched signal is then passed through a driving inverter comprising PFET 634 and NFET 636 before being output for further processing in accordance with the invention. As a result of this configuration, a fast path for the critical bypass path is provided since fewer gate delays are required for the bypass inputs.

The present invention as herein described provides a simple technique for providing consistent encoding across the floating point processing units while also providing efficient bypass by removing the multiplexers from the critical speed paths. The present invention also places the bit masking in the operand alignment circuit 300 rather than in the floating point processing units so as to avoid putting the operand alignment circuits in the critical paths of the floating point processing units 106–110. As a result, processing efficiency is greatly improved in accordance with the invention.

Although an exemplary embodiment of the invention has been described in detail above, those skilled in the art will appreciate that many additional modifications are possible in the exemplary embodiment without materially departing from the novel teachings and advantages of the invention. For example, the invention is not limited to single and double precision operations and may also be used with a QUAD floating point format which uses 128 bits as well as other formats which are known to those skilled in the art. Accordingly, all such modifications are intended to be included within the scope of this invention as defined in the following claims.

We claim:

1. A processor for performing floating point operations on input operands, comprising:
   a data register for storing operands of at least one of a first and a second precision, where said second precision has a greater number of mantissa bits than said first precision;

a floating point processor for performing floating point mathematical operations on said operands stored in said data register; and an operand alignment circuit for converting said operands from said data register into operands in a common format having the precision of said floating point processor and for providing the operands in said common format to said floating point processor for processing, said operand alignment circuit comprising means for aligning least significant bits of exponents and mantissas of operands of both said first and second precisions, means for inserting a predetermined number of bits of a predetermined logic value into the most significant bits of said exponents and mantissas of said operands when converting an operand of said first precision to said common format, and means for eliminating a predetermined number of most significant bits of said exponents and mantissas of results when converting a result from said common format to a result of said first precision.

2. A processor as in claim 1, wherein said operand alignment circuit comprises a multiplexer responsive to an indication of whether a current floating point mathematical operation includes operands representing single word integers, double word integers, single precision floating point values and double precision floating point values and at least one result in said common format output from said floating point processor at respective inputs thereof, said multiplexer providing a single output in said common format to said floating point processor for processing.

3. A method of performing floating point operations, comprising the steps of:

providing input operands of at least one of a first and a second precision, where said second precision has a greater number of mantissa bits than said first precision;

converting said input operands into operands in a common format having the precision of predetermined floating point processors which perform said floating point operations, said operand converting step comprising the steps of aligning least significant bits of exponents and mantissas of input operands of both said first and second precisions, inserting a predetermined number of bits of a predetermined logic value into the most significant bits of said exponents and mantissas of said input operands when converting an operand of said first precision to said common format, and eliminating a predetermined number of most significant bits of said exponents and mantissas of results when converting a result from said common format to a result of said first precision;

providing the input operands in said common format to said floating point processors for processing; and performing floating point mathematical operations on operands provided in said input operands providing step.

4. A method as in claim 3, comprising the further steps of performing additional floating point operations on the results of said operations performing step without performing said converting step on said results, and then storing the results of said additional floating point operations in data registers corresponding to the floating point processor used for said additional floating point operations.

* * * * *